United States Patent
Milovancevic

[11] 3,790,879
[45] Feb. 5, 1974

[54] SWITCHING VOLTAGE REGULATOR
[76] Inventor: Slavko Milovancevic, P.O. Box 402, Torrance, Calif. 90508
[22] Filed: Nov. 12, 1971
[21] Appl. No.: 198,311

[52] U.S. Cl.......... 323/22 T, 321/45 C, 307/252 M, 323/38
[51] Int. Cl. .............................................. G05f 1/56
[58] Field of Search........ 323/4, 9, 17, 22 T, 22 SC, 323/23, 24, 25, 38, DIG. 1; 321/16, 45 C, 45 S; 307/240, 248, 252 J, 252 M, 296, 297

[56] References Cited
UNITED STATES PATENTS
3,336,524  8/1967  Healey ............................ 323/22 SC
3,641,424  2/1972  Kuvkendall .................... 323/DIG. 1
3,505,583  4/1970  Burkhardt et al. ............. 323/22 T X
3,218,542  11/1965  Taylor .............................. 323/22 T FOREIGN PATENTS OR APPLICATIONS
980,631  0/1965  Great Britain ....................... 323/17

Primary Examiner—Gerald Goldberg

[57] ABSTRACT

A switching voltage regulator for providing constant voltage to a load from an unregulated d-c source of any form, employing a series control transistor whose on and off state is controlled by a modified static switch either directly, or through a transistor driver stage. The modified static switch serves also the purpose of sensing the output voltage magnitude and initiating the conduction of said control transistor, when the same is supplied with an input d-c voltage.

3 Claims, 2 Drawing Figures

Fig. 1.

Note: 7 = Collector
8 = Base      } in Fig. 1.
9 = Emitter

Patented Feb. 5, 1974 3,790,879

Note: 7 = Collector
8 = Base } in Fig. 1.
9 = Emitter

Note: 7' = Emitter
8' = Base } in Fig. 2.
9' = Collector

INVENTOR.

BY Slavko Milovančević

(SLAVKO MILOVANCEVIC)

SWITCHING VOLTAGE REGULATOR

BACKGROUND OF THE INVENTION

This invention relates generally to the regulation of electric power supplied to the load (consumer of said power), and more particularly to the d-c voltage switching type device including a modified static switch for purpose of starting, sensing and control. As an improved solution a driver stage is used for driving of the series control transistor.

Two most common ways of controlling the d-c voltages across a load are : First by using a series control transistor as a dissipative means (i.e., as a variable resistor) whose resistance and thus the voltage drop across it is properly controlled by shifting its operating point as load current varies in order to maintain a constant voltage across said load. The second way of controlling is by using the series transistor (connected in series with the load across supply voltage) as a switch who couples from time to time supply voltage to said load and a storage capacitor; said capacitor maintains the voltage across the load while the supply voltage is disconnected. The switching of said series transistor is achieved by shifting its operating point from cut-off into conduction region, or more precisely to saturation part of conduction region, alternately. Besides said, these circuits are designed to have the performance independent from the ambient temperature change, to be immune to short-circuiting of output terminals, excessive load current, etc.

Many circuits have been devised to serve the purpose, many of them complex, especially the switching types.

It is an objective of this invention to provide a simple, effective, dependable and inexpensive switching regulating device. And further to provide a circuit which would operate on any type of d-c input voltage be it battery voltage, rectified unfiltered a-c or filtered A.C. or any type of d-c pulsating voltage, without use of inductance in any form. More particularly it is objective of this invention to provide a voltage regulating device using a modified static switch to initiate the conduction of the series transistor, to sense when the voltage across storage capacitor had reached the desired value (magnitude) and render the series control transistor nonconductive at that moment (instant) maintaining the voltage across load practically constant or within precisely defined limits.

With these and other objectives in view, which will become apparent through further description, this invention offers a novel combination and arrangement of circuit elements as described in the subsequent part of this specification and as depicted in the accompanying drawings.

DESCRIPTION OF THE DRAWING

The drawing consists of two figures representing two possible circuits where.

DETAILED DESCRIPTION OF OPERATION

Figure 1:
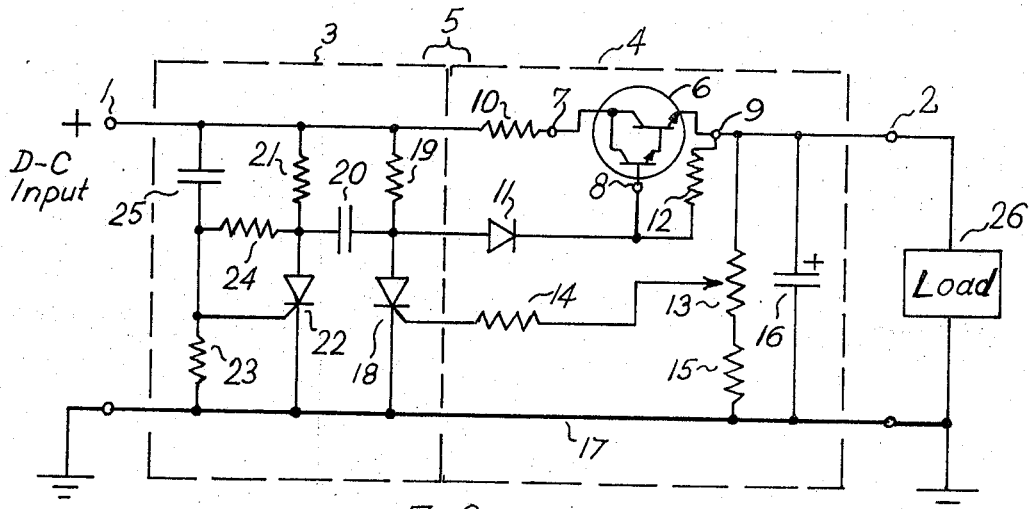
FIG. 1 represents circuit diagram of a switching voltage regulator using an N-P-N Darlington transistor as series control means.

Referring now to the FIG. 1, numeral 5 indicates general device of this invention having a regulating section designated 4 and containing a control transistor, arrangement of two resistors to form a voltage divider across output, also a storage capacitor, a protective diode and resistor, while section designated 3 contains the modified state switch having self-starting properties.

Power from the d-c source (not shown) in any form of d-c voltage is coupled through input terminal 1 to the collector 7 of an n-p-n Darlington amplifier 6. As known in the art regulated d-c voltage may be coupled from the emitter 9 of Darlington amplifier 6 by applying power bias in proper time intervals upon the base of control transistor 6 charging the storage capacitor 16, which will supply the load 26 through output terminal 2, and through common lead 17 return to the negative terminal of the supply voltage (not shown).

Proper control of the bias impressed upon the base of transistor 6 is obtained by sampling the regulated output by means of series connection of a resistor 15 and a variable resistor 13 connected between emitter 9 and common lead 17, and by connecting the variable arm of said resistor 13 through gate current limiting resistor 14 to gate of a Semiconductor Controlled Rectifier (SCR) designated 18 in the modified static switch 3 which will effect the actual control of the bias of said transistor 6.

Operation of the regulating circuit 4 will be explained best in conjunction with explanation of operation of circuit 3.

As a reminder of what is and how operates a static switch (more precisely a semiconductor static switch) please use as reference, for example, Motorola's : "Semiconductor Power Circuits Handbook" (First edition November, 1968).

As shown in FIG. 1 section designated 3 consists of two SCR's designated respectively as 18 and 22 connected by their respective cathodes to the lead 17, while anode of each is connected through a separate resistor designated 19 and 21 respectively, to the input terminal 1. Anodes of said SCR's are interconnected by a commutating capacitor designated 20. In addition anode of SCR 18 is connected to the anode of the blocking diode 11 whose cathode is coupled to the base 8 of transistor 6. Similarly, from anode of SCR 22 a resistor 24 is coupled to its gate; from said gate another resistor designated 23 is connected to the common lead 17 and a capacitor designated 25 to the input terminal 1. Gate of SCR 18 is connected through the gate current limiting resistor 14 to the variable arm of said resistor 13 as mentioned before.

To explain the functioning of section 3 let us assume that initially capacitor 16 is not charged at all, that voltage across it is zero. The instant a potential (d-c) is coupled to the terminal 1 the potential at terminal 1 will rise from zero to the maximum possible value. Since capacitor 25 sees a changing voltage during this time it will be charged and will transfer a positive charge to the gate of SCR 22 triggering it into conduction. Current through SCR 22 will be defined by voltage across terminal 1 less voltage drop across conducting SCR 22 and by the resistor 21. SCR 18 had remained non-conductive since there was no potential across capacitor 16, transistor 6 will receive its base bias current through resistor 19 and diode 11 starts conducting heavily a current defined mainly by input potential (at terminal 1) and current limiting resistor 10, charging capacitor 16 relatively slow. As capacitor 16 is charged its potential rises from zero toward the present magnitude defined by position of variable arm of resistor 13. Evidently emitter 9 potential rises with potential across 16 since it is coupled to it, while bae potential toward lead 17 ("ground") rises at same pace to reach the preset magnitude at terminal 2 plus base 8 to emitter 9 voltage drop. Potential at anode of SCR 18 and diode 11 will follow rise of potential across 16, and the moment 16 has the desired preset potential anode of SCR 18 will reach a potential equal to potential across 16, plus base 8 to emitter 9 voltage drop, plus voltage drop across diode 11 junction. Note now that charging current for 16 had a path : input terminal 1, through resistor 10, collector 7, emitter 9; while part of the current is base current of transistor 6; storage capacitor 16, common lead 17 and negative terminal of the input. As voltage across anode of SCR 18 reaches its maximum commutating capalitor 20 follows it. Since its opposite plate is coupled to the anode of SCR 22 which is conductive, capacitor 20 will be charged to a potential equal to potential at anode of SCR 18 less voltage drop across conductive SCR 22 (approximately 1 volt). At this instant voltage across variable arm of resistor 13 reaches value sufficient to trigger SCR 18 and render it conductive. The instant SCR 18 conducts fully, potential at its anode drops to about 1 volt, thus anode of diode 11 sees only 1 volt toward lead 17 (ground) while its cathode sees full output voltage across 16 through protective resistor 12. If resistor 12 were not there full output voltage would be divided by diode 11 junction and emitter 9 to base 8 junction of transistor 6, each junction would see about one-half of the output voltage across 16 (would be reverse biased by that voltage) thus could break first of all emitter to base junction of transistor 6. Protective action of resistor 12 and diode 11 is now clear. Note well that emitter to base juction of transistor 6 is now reverse biased, thus no base bias current flow so that transistor 6 will stop conductive state after storage time is over, and will resume non-conductive state. Indeed: change of conduction states of transistor 6 is being controlled by the modified static switch 3 as initially claimed. Let us turn back to the section 3. The moment SCR 18 is fully conductive commutating capacitor 20 is connected with its positively charged plate to a potential about 1 volt above lead 17 (i.e., ground potential) while its negatively charged plate (at a potential of about output voltage) is at the anode of still conductive SCR 22. However, due to this negative potential on commutating capacitor 20 anode current of SCR 22 will suddenly drop to zero, thus below the holding current of SCR 22, causing SCR 22 to turn-off, i.e., become non-conductive. Since SCR 22 is non-conductive and 18 is conductive commutating capacitor will start now charging positive at the anode of non-conducting SCR 22 through resistor 21 and SCR 18, while negative at the anode of SCR 18. The present situation is : transistor 6 is non-conductive, diode 11 and SCR 22 as well, while SCR 18 is conductive, load 26 is supplied by charged capacitor 16. Charging of capacitor 20 through resistor 21 and SCR 18 continues. At the same time note that gate of SCR 22 is exposed to negative potential from capacitor 20 just like its anode is, but not with full potential of capacitor 20 than fraction of it as defined by resistors 23 and 24 which from a voltage divider thus scaling the negative voltage across capacitor 20 to acceptable value to prevent breakdown of the gate to cathode junction of SCR 22 which is now reverse-biased. The fact that this junction is reverse-biased and that voltage at anode of SCR 22 has a negative potential guarantees that SCR 22 will remain inoperative for the period of time needed to recharge capacitor 20 positive at anode of SCR 22 through resistor 21 and SCR 18 as mentioned before. During same period of time load 26 had drained capacitor 16 sufficiently enough so that gate of SCR 18 is not any more sufficiently forward biased, and the moment potential at anode of SCR 22 is high enough to cause full forward biasing of gate to cathode of SCR 22 which occurs at a later moment, SCR 22 will trigger through resistors 24 and 23 gate current and will assume conductive state as initially. Since commutating capacitor 20 is coupled by its positive plate to a potential only about 1 volt from ground at anode of SCR 22, still conductive SCR 18 will be exposed to a negative potential from 20 nearly equal to input voltage, SCR 18 anode current will suddenly decrease to zero, thus below SCR's holding current and SCR 18 will become non-conductive. This situation is same as it was just before SCR 18 become conductive after input voltage was coupled to the input terminal 1. From now on whole process is simply being repeated again and again in order to supply the load 26 with constant (practically speaking) potential as anticipated.

Figure 2:
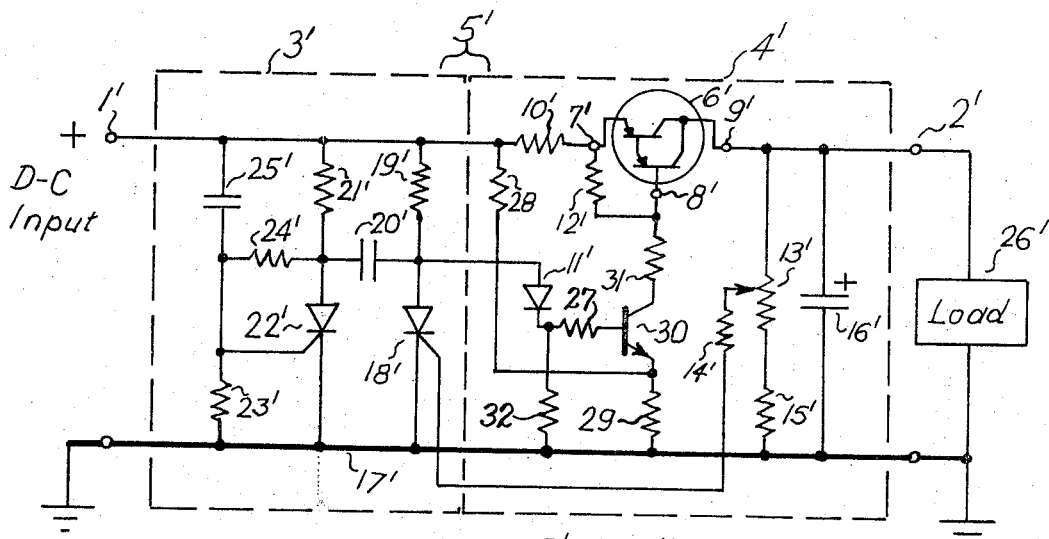
FIG. 2 represents circuit diagram of a switching voltage regulator using a P-N-P Darlington transistor as series control means and an N-P-N transistor as its driver. In addition both circuits make use of a modified static switch as switching control means, and both are to be supplied with and to deliver positive voltage.

Referring now to FIG. 2 of the present invention, a further improvement is achieved by this circuit arrangement. Section 3' in FIG. 2 is circuitwise same as section 3 in FIG. 1. The difference is in section 4' as compared to section 4 in FIG. 1. Note that first of all a p-n-p Darlington amplifier is used instead of n-p-n as in FIG. 1. Its emitter 7' being coupled to the input input terminal 1', it's collector 9' to the output terminal 2', base to emitter protective resistor 12' coupled between 7' and its base 8'. In addition the base 8' is now coupled to the collector of an n-p-n driver transistor designated 30 through a collector resistor 31. Emitter of transistor 30 is connected to the common lead 17'(ground) through an emitter resistor designated 29, and to the input terminal 1' through a resistor designated 28. Resistors 28 and 29 form a voltage divider for purpose to elevate emitter and base potentials of transistor 30 high enough over ground potential (lead 17') to assure about minus 0.5 volts base to emitter when SCR 18' is conducting. This will assure efficient cut-off of transistor 30, i.e., it will assure it to become non-conductive. Since transistor 6' is a control transistor and driven by the driver transistor 30 it will become non-conductive at the same time as transistor 30, thus modified static switch 3' controls conduction, i.e., switching of transistor 6' indirectly but efficiently. This in turn means that charging of the storage capacitor 16' is controlled more effectively than in FIG. 1 and that voltage regulation as experienced by the load 26' is improved. Transistor 30 is driven by SCR 18' through the protective diode 11' and the base current limiting resistor 27. Protective diode 11' protects in this case base to emitter junction of transistor 30 when SCR 22' starts conducting and commutating capacitor 20' couples its negatively charged plate to the anode of said diode 11' rendering it reverse-biased, thus nonconductive, thus no negative voltage from 20' will be impressed across base-emitter junction of transistor 30, i.e., the said junction will be protected from the destructive negative voltage. Note well also the fact that base 8' of transistor 6' has more than output voltage for biasing purposes while 6 in FIG. 1 could have as little as 2 volts, thus switching can be better defined for circuit in FIG. 2 than for that in FIG. 1. Transistor 30 is biased into saturation (full conduction) so is control transistor 6' whenever SCR 18' is non-conductive, and 30 and 6' are non-conductive whenever SCR 18' is conductive. The operation of the modified static switch 3' is essentially same as of the section 3 in FIG. 1. Explanation of its operation is considered, therefore, unnecessary.

Many more modifications and improvements of this invention are possible and apparent to those skilled in the art, all of which fall within the scope of this invention.

I claim as my invention the following:

1. A modified static switch used as switching control means and comprising first and second Silicon Controlled Rectifier (SCR) each respective SCR coupled to said common terminal by its cathode, a commutating capacitor connected between anodes of said SCR's, each respective anode connected to a resistor, each resistor connected by its remaining end to an input terminal and to a (starting) starting capacitor having its other plate connected to the gate of said second SCR, and to a second SCR gate protective resistor connected between gate and cathode electrodes, a feedback resistor connected between anode and the gate of said second SCR, gate electrode of said first SCR being responsive to the signal applied between gate - cathode electrodes, and finally a connection from anode of said first SCR used as a shifting potential point convenient for control of other circuits (as in previous claims f.e.).

2. A switching voltage regulator circuit responsive to d-c input voltage and delivering regulated and filtered output voltage, comprising input terminal, common terminal, output terminal, transistor switch connected between said input and output terminals, a storage capacitor connected between said common and said output terminals, series connection of a fixed resistor connected to said common terminal and a variable resistor connected to said output terminal to sense the voltage across said storage capacitor, a protective resistor connected between said output terminal and the control electrode of said transistor switch, a current limiting resistor connected between said input terminal and said transistor switch, a protective diode connected by its cathode to said control electrode, a sensing resistor connected to the variable arm of said variable resistor, a modified static switch (indicated by the square designated 3 in FIG. 1) to sense the voltage across output terminals through said sensing resistor and to control the switching of said transistor switch through said protective diode, and comprising first and second Silicon Controlled Rectifier (SCR), each respective SCR having its cathode connected to said common terminal, a commutating capacitor connected between anodes of said SCR's, each respective anode connected to a resistor, each resistor connected by its remaining end to said input terminal and to a starting capacitor, whose other plate is connected to the gate electrode of said second SCR and to a second SCR gate protective resistor connected between gate and cathode electrodes, a feedback resistor connected between anode and the gate of said second SCR, gate electrode of said first SCR being responsive to the signal applied between gate - cathode electrodes, and finally, anode electrode of said first SCR is connected to the anode electrode of said protective diode.

3. A switching voltage regulator circuit responsive to d-c input voltage and delivering regulated and filtered output voltage, comprising input terminal, common terminal, output terminal, a transistor switch connected to said input and output terminals, current limiting resistor connected between said input terminal and said transistor switch, storage capacitor connected to said common and output terminals, a fixed resistor connected to said common terminal and in series with a variable resistor coupled to said output terminal to sense output voltage, a protective resistor coupled to said transistor switch and said current limiting resistor junction, while its other end is connected to control electrode of said transistor switch, sensing resistor coupled to the arm of said variable resistor, voltage divider consisting of two resistors and coupled to said common and input terminals to provide voltage reference for emitter electrode of an n-p-n transitor, used to drive said transistor switch through a collector resistor connected to its control electrode, a base current limiting resistor for said n-p-n transistor, with its other end coupled to a protective resistor (having remaining end connected to said common terminal) and to the cathode of a protective diode, whose anode is connected to a modified static switch (indicated by the square designated 3' in FIG. 2) to sense the voltage across output terminals through said sensing resistor, and to control the switching of said transistor switch through said protective diode, comprising first and second Silicon Controlled Rectifier (SCR), each respective SCR having its cathode connected to said common terminal, a commutating capacitor connected between anodes of said SCR's, each respective anode connected to a resistor, each resistor coupled by its remaining end to said input terminal and to a starting capacitor, whose other plate is connected to the gate electrode of said second SCR and to a second SCR gate protective resistor connected between gate and cathode electrodes, a feedback resistor connected between anode and the gate of said second SCR, gate electrode of said first SCR being responsive to the signal applied between gate - cathode electrodes, and finally, anode electrode of said first SCR is connected to the anode electrode of said protective diode.

* * * * *